Dec. 13, 1955 C. W. MARTIN 2,726,720

HAND OPERATED KEYPUNCH

Filed July 7, 1952 10 Sheets-Sheet 1

INVENTOR.
CLARENCE W. MARTIN
BY
Mellin and Hanscom
ATTORNEYS.

Dec. 13, 1955 C. W. MARTIN 2,726,720

HAND OPERATED KEYPUNCH

Filed July 7, 1952 10 Sheets-Sheet 2

INVENTOR.
CLARENCE W. MARTIN

BY

Mellin and Hanscom

ATTORNEYS.

Dec. 13, 1955 C. W. MARTIN 2,726,720

HAND OPERATED KEYPUNCH

Filed July 7, 1952 10 Sheets-Sheet 3

INVENTOR.
CLARENCE W. MARTIN

BY

Mellin and Hanscom
ATTORNEYS.

Dec. 13, 1955 C. W. MARTIN 2,726,720

HAND OPERATED KEYPUNCH

Filed July 7, 1952 10 Sheets-Sheet 4

INVENTOR.
CLARENCE W. MARTIN
BY
Mellin and Hanscom
ATTORNEYS.

Dec. 13, 1955 C. W. MARTIN 2,726,720

HAND OPERATED KEYPUNCH

Filed July 7, 1952 10 Sheets-Sheet 5

INVENTOR.
CLARENCE W. MARTIN

BY

Mellin and Hanscom

ATTORNEYS

INVENTOR.
CLARENCE W. MARTIN
BY
Mellin and Hanscom
ATTORNEYS.

INVENTOR.
CLARENCE W. MARTIN
BY
Mellin and Hanscom
ATTORNEYS.

Dec. 13, 1955 C. W. MARTIN 2,726,720

HAND OPERATED KEYPUNCH

Filed July 7, 1952 10 Sheets-Sheet 8

INVENTOR.
CLARENCE W. MARTIN

BY

Mellin and Hanscom

ATTORNEYS.

Dec. 13, 1955 C. W. MARTIN 2,726,720

HAND OPERATED KEYPUNCH

Filed July 7, 1952 10 Sheets-Sheet 9

INVENTOR.
CLARENCE W. MARTIN
BY
Mellin and Hanscom
ATTORNEYS.

Dec. 13, 1955 C. W. MARTIN 2,726,720

HAND OPERATED KEYPUNCH

Filed July 7, 1952 10 Sheets-Sheet 10

INVENTOR.
CLARENCE W. MARTIN

BY

Mellin and Hanscom
ATTORNEYS.

United States Patent Office 2,726,720

Patented Dec. 13, 1955

2,726,720

HAND OPERATED KEYPUNCH

Clarence W. Martin, Athens, Ohio, assignor, by mesne assignments, to Royal McBee Corporation, a corporation of New York Application July 7, 1952, Serial No. 297,417

4 Claims. (Cl. 164—112)

This invention relates to a card or sheet punching machine, and particularly to a machine for selectively punching or coding classification cards.

In the copending application of Hunter E. Hooe for "Keysort Keypunch," Ser. No. 248,249, filed September 25, 1951, there is disclosed a machine of the above general type having a plurality of numerical value punches and a keyboard selectively settable to selectively activate the punches so that when a motor, drivingly connected to the punches, is energized, the selectively activated punches are driven through the edge or margin of a card to code the same. The motor in the machine is controlled by two motor control bars, one of which is so operatively connected to the keyboard keys that when depressed, it causes not only the actuation of the numerical value punches, but in addition causes the elevation of the set keys on the keyboard to clear the keyboard, and the other of which is so operatively connected to the keyboard keys that when depressed, it also causes actuation of the numerical value punches but leaves the set keys depressed so as to preserve the set pattern on the keyboard enabling a repeat coding operation on other cards, to be effected.

This prior machine also includes column repeat keys for enabling clearing of selective rows of keyboard keys before and after a punching operation, and also a plurality of cipher punches which can be arranged to automatically cipher punch a code area provided no numerical value keys for that area that are depressed.

Among the advantages of the prior machine is that the punches are motor driven through the cards. However, some installations do not justify the expense of a motor driven machine, and it is therefore a primary object of the present invention to provide a machine similar to the one above described but adapted to be manually operated, and which though wholly manually operated has the same flexibility of operation as the prior described machine.

Various other objects of the present invention will be apparent from the following description taken in connection with the accompanying drawings, in which.

Figure 1:
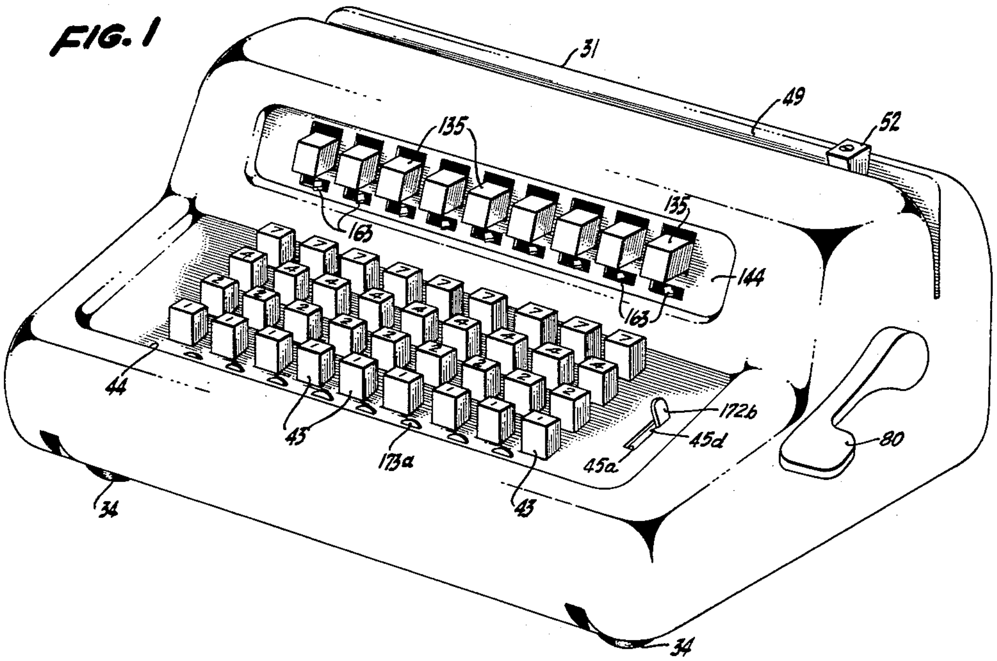
Fig. 1 is a perspective view of the machine embodying the concepts of the present invention.

The specific embodiment of the machine disclosed in the drawings is particularly adapted for punching a so-called P. M. Zenner card such as disclosed in Figs. 2, 3, 4 and 5, but the invention is not intended to be limited by reference to the punching of the Zenner card which is disclosed only to illustrate a practical application of the present invention. Reference to the manner of punching the Zenner card will be referred to more in detail hereinafter, but at present it suffices to say that along one or more edges of the card there is provided a plurality of areas to be coded, each area having four outer perforations associated with numerals 1, 2, 4 and 7 and an inner perforation normally disposed in alignment with and inwardly of the "1" perforation. When any number from 1 to 9 is desired in a particular area, the particular perforation or perforations are notched to the card edge from the outer row of perforations. By a suitable combination of notches, any number from 1 to 9 can be obtained in an area. When an area is to indicate a zero classification, the card is slotted from the "1" perforation to the "0" perforation, such as shown at 176 in Fig. 3.

Now, referring to the accompanying drawings wherein similar reference characters designate similar parts throughout, the machine disclosed and embodying the concepts of the present invention includes an operating mechanism enclosed by a casing consisting of a cover 31 and a base 32 connected together by screws 33, said base being supported by suitable feet or pads 34. Supporting the operating mechanism within the case is a frame generally entitled 35 including a bottom mounting plate 36 secured to base 32 by screws 37, and spaced upright side members 38 and 39, secured to the mounting plate at their lower ends (compare Figs. 6 and 7).

Connected to and supported by side members 38 and 39 are a pair of spaced guide plates 41 and 42. Guide plates 41 and 42 have groups of vertically aligned slots formed therein receiving and guiding the stems 43*a* of a plurality of columns of vertically movable numerical value keys 43 (see Fig. 9). Keys 43 form a keyboard exposed by an opening 44 formed in the forward portion of top cover 31 (see Fig. 9), there being a suitable reticulated face plate 45 secured to side frame members 38 and 39 and surrounding the heads of keys 43.

Operatively associated with keys 43 are a set of numerical value punches 46 equal in number to the number of keys and arranged horizontally, parallel and adjacent to one another and guided for horizontal movement by a die block 47 suitably recessed therethrough to slidably receive the punches. Die block 47 is secured at its ends to side frame members 38 and 39 and has a longitudinally extending V-groove 48 terminating at its lower end in a straight card positioning portion adapted to receive and position a card A. The top cover 31 is formed with slot 49 registering with V-groove 48 and extending transversely of the machine, as clearly shown in Fig. 1, and defined by in-turned lips 51 (see Fig. 9). An adjustable card positioning gauge 52 is seated within lips 51 and adjustably held in place by a screw 53 threadedly received by a nut 54 engaging the lower ends of lips 51. A classification card is inserted into slot 49 in the casing cover 31 and into V-groove 48 and seated against the die block 47 in a position against adjustable gauge 52 to initially position the card with reference to punches 46 and another set of punches to be described hereinafter.

Numerical value keys 43 and numerical value punches 46 are associated or paired off in the following manner: Proceeding from left to right of the punches, the keys are associated therewith beginning with the extreme lefthand column of keys, as the parts are shown in Fig. 6, and proceeding to the extreme righthand column of keys, and proceeding from the top key of each column to the bottom key of each column.

Figure 6:
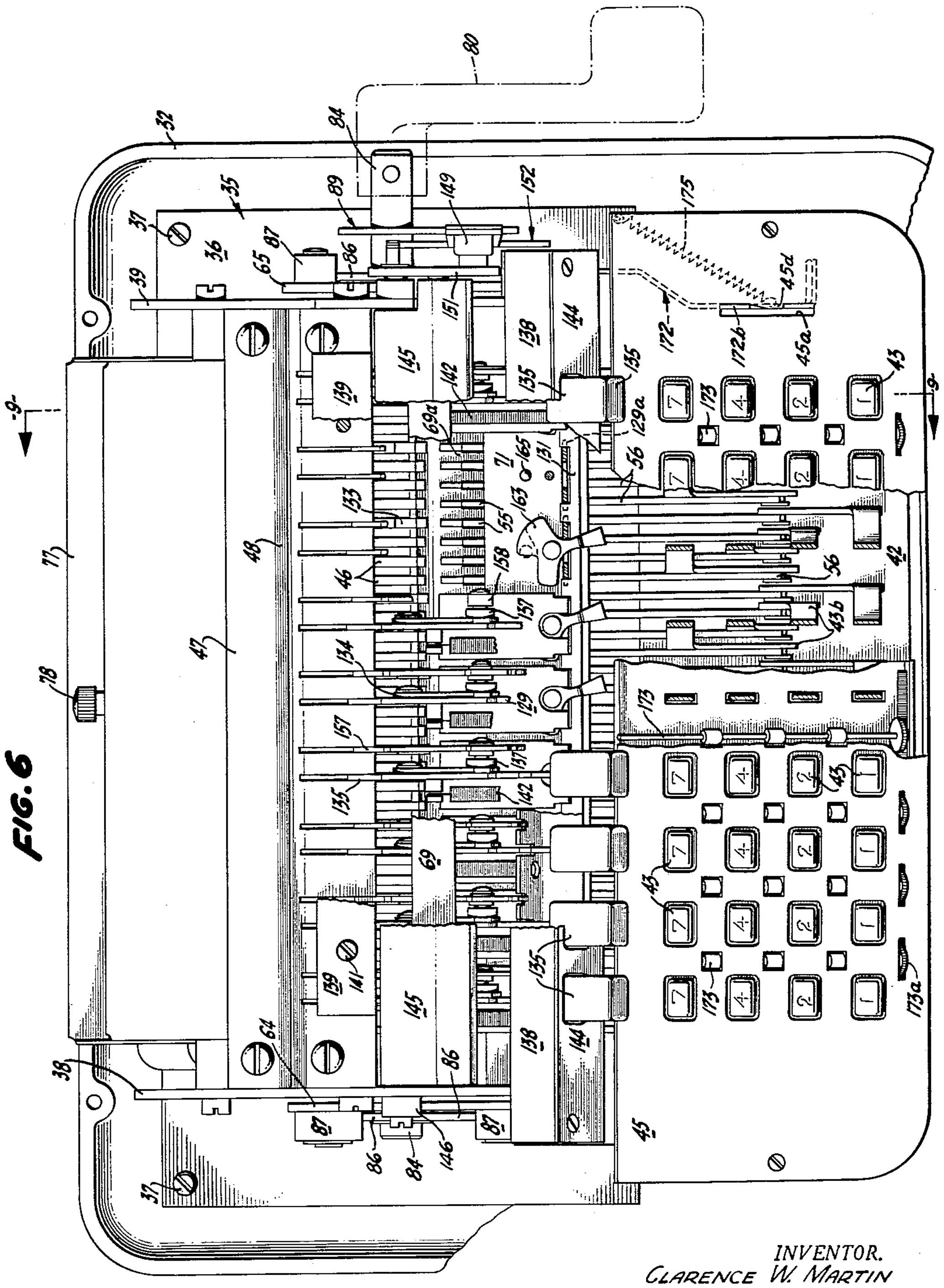
Fig. 6 is a top plan view of the machine disclosed in Fig. 1 with the top cover removed and parts partly broken away for convenience in illustration.
Figure 7:
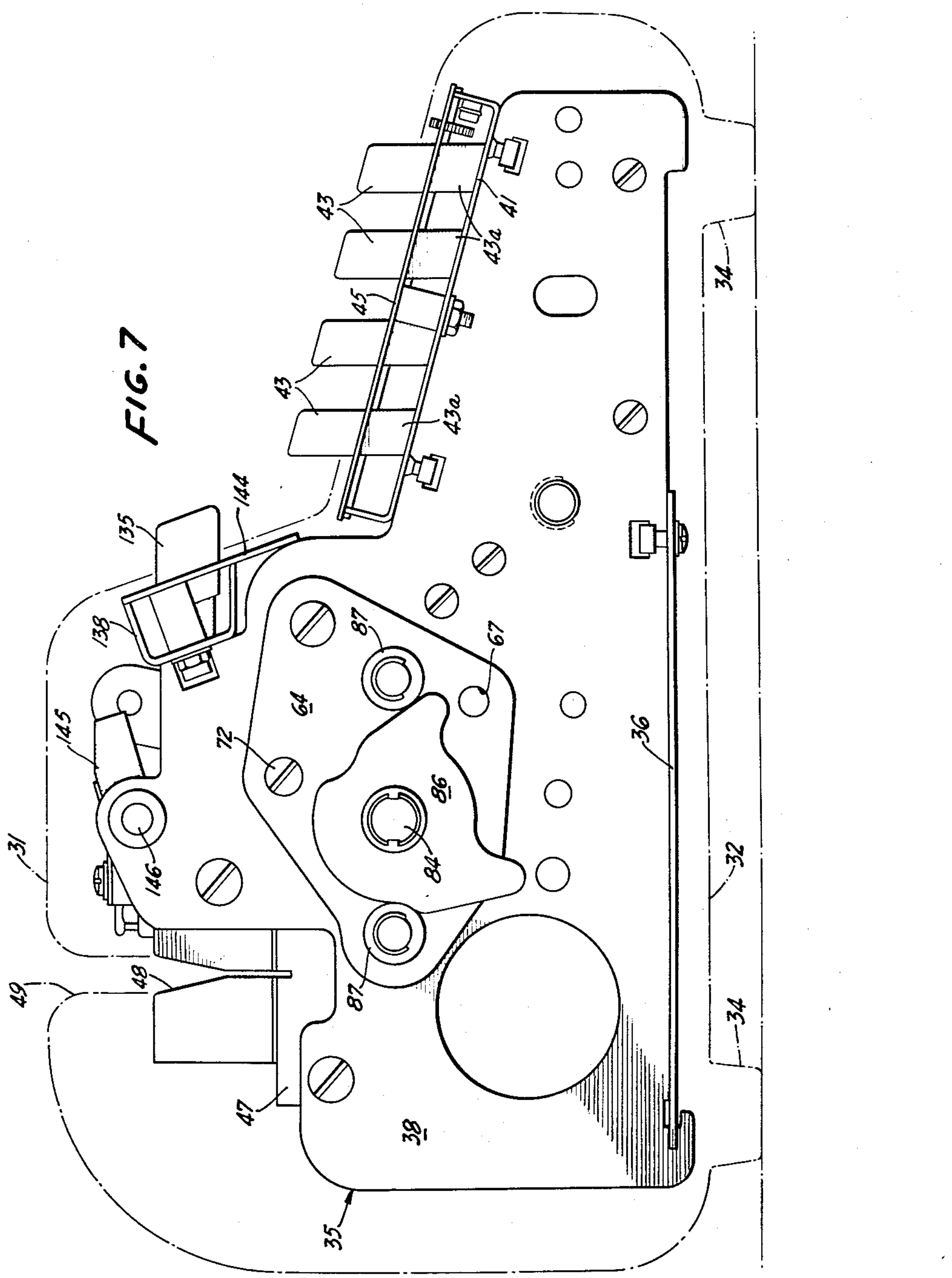
Fig. 7 is a lefthand end view of the machine disclosed in Fig. 1, showing the outline of the case in dot-dash lines.
Figure 9:
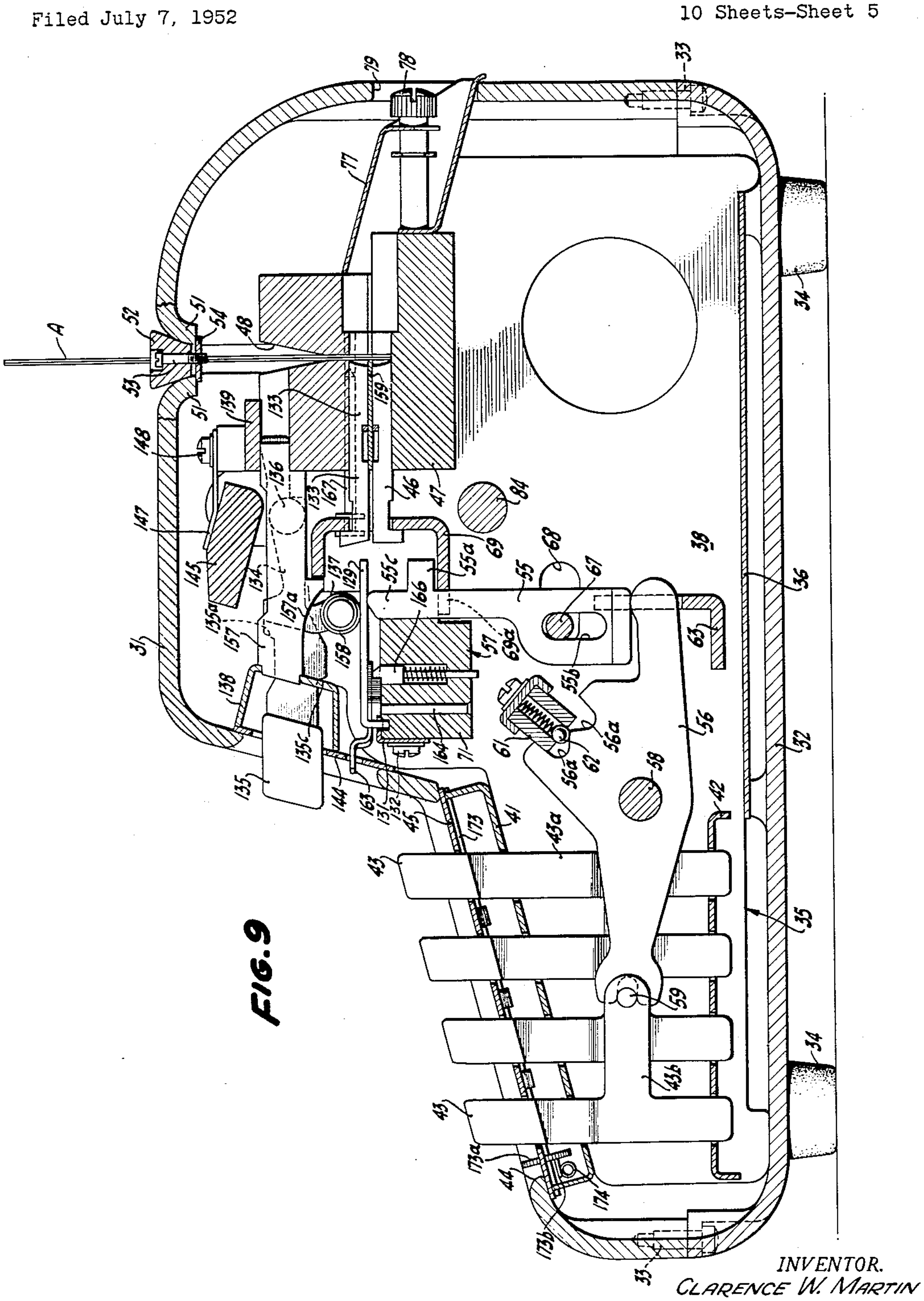
Fig. 9 is a vertical longitudinal sectional view taken along line 9—9 of Fig. 6, showing the machine prior to setting of any of the keys on the main keyboard and prior to actuation of the punches.

Referring to Figs. 6 and 9, numerical value keys 43 are adapted, when depressed or set, to elevate a plurality of vertically movable punch actuators 55, through the medium of a plurality of key levers 56, from lower inoperative positions to upper operative positions to register rearwardly extending noses 55*a* on the punch actuators with the forward portions of punches 46. Throughout the following description, when reference is made to the forward portion of a part, this has reference with respect to the front of the machine, and, when reference is made to the rear or rearward portion of a part, this has reference to the back or rear part of the machine. For the sake of clarity, this plan will be adhered to even with regard to the punches which have their operative cutting edges facing toward the back of the machine and, therefore, these operative edges will be referred to as the rearward portions of the punches, and the opposite ends of the punches will be referred to as the forward portions of the punches.

Punch actuators 55 are carried by a reciprocating carriage, generally entitled 57, rearwardly toward the punches, the operatively disposed punch actuators engaging their punches to drive the same through a classification card supported by die block 47. Carriage 57 will be described in detail hereinafter. As is apparent from Fig. 9, the punch engaging noses 55*a* of the punch actuators 55 are normally spaced below and forwardly of the forward ends of punches 46 and, therefore, the punch actuators which are not elevated will merely move beneath the forward ends of the punches and, therefore, not actuate the punches.

Key levers 56 are equally spaced from and parallel to one another and are pivotally mounted intermediate their ends on a pivot shaft 58 secured at its ends to side frame members 38 and 39. Since key levers 56 are laterally spaced from one another and since numerical value keys 43 are arranged in longitudinally extending columns, the depending stems 43*a* of numerical value keys 43 are laterally bent to the right or left depending on the location of each key relative to its key lever, and have forward or rearward extensions 43*b*, again depending on the location of each key relative to its key lever, on the ends of which extensions are provided headed pins 59 laterally aligned with one another and receivable in bifurcated forward ends formed on key levers 56. The forward ends of key levers 56 are, therefore, guided by the co-action of extensions 43*b* and the heads of pins 59.

Numerical value keys 43 are limited in their vertical movement by a detent bar 61 secured at its ends to side frame members 38 and 39, said detent bar being receivable within W shaped notches 56*a* formed in key levers 56. Numerical value keys 43 are urged to occupy one or the other of their extreme positions, i. e., either their normal elevated positions or their depressed set positions, by a plurality of spring-pressed ball detents 62 mounted in detent bar 61 and disposed in registry with key levers 56 and engaging the humped portions of the key levers formed by the particular notch formation to have an over-center action therewith.

Figure 11:
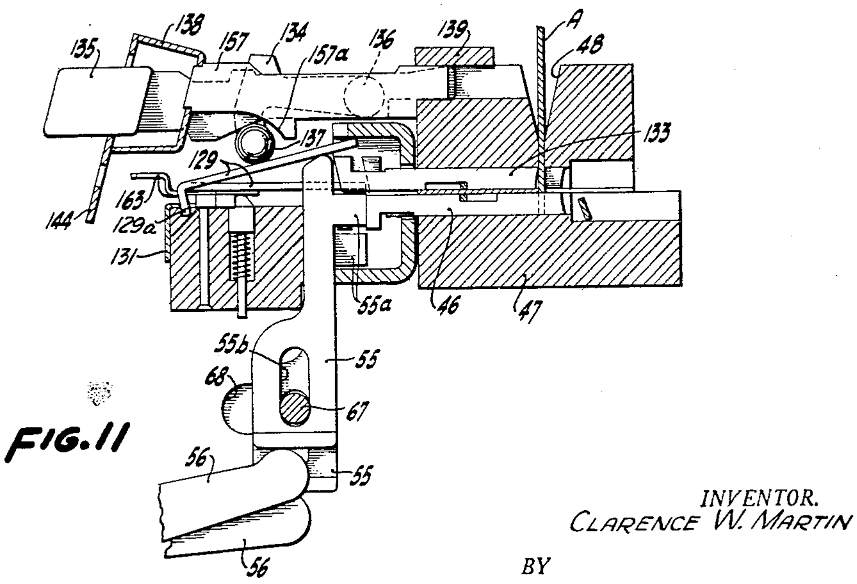
Fig. 11 is a fragmentary view, similar to Fig. 10, showing the position of the parts during the punching stroke of the reciprocating carriage.

At their lower ends, punch actuators 55 rest on the rearward ends of key levers 56, said lower ends of said punch actuators having sufficient depth to remain in engagement with their key levers throughout the forward and rearward movement of the punch actuators relative to the key levers (compare Figs. 9 and 11). The rearward ends of key levers 56 and the lower ends of punch actuators 55 are guided by a comb 63 secured at its ends to side frame members 38 and 39.

*Traveling carriage assembly*

Traveling carriage 57 includes two end plates 64 and 65 (see Figs. 7, 8 and 12), disposed adjacent the outer faces respectively of side frame members 38 and 39 and slightly spaced from the side members by washers (not shown), fitting on a main drive shaft to be described. End plates 64 and 65 are connected by various elements, to be explained, but of immediate importance by a guide rod 67 secured at its ends to end plates 64 and 65 and extending through clearance slots 68 formed in side frame members 38 and 39 and through vertically disposed oblong guide slots 55*b* formed in punch actuators 55 to assist in guiding the actuators for vertical movement (see Fig. 9).

Punch actuators 55 are also guided for vertical movement by a comb 69*a* formed on a U-shaped punch retractor 69. Retractor 69 is slotted longitudinally to receive the forward ends of numerical value punches 46 which have depending portions formed thereon engaging the retractor 69 and enabling the retractor to retract the punches after a punching operation, said retractor being carried by carriage 57.

Figures 19, 20:
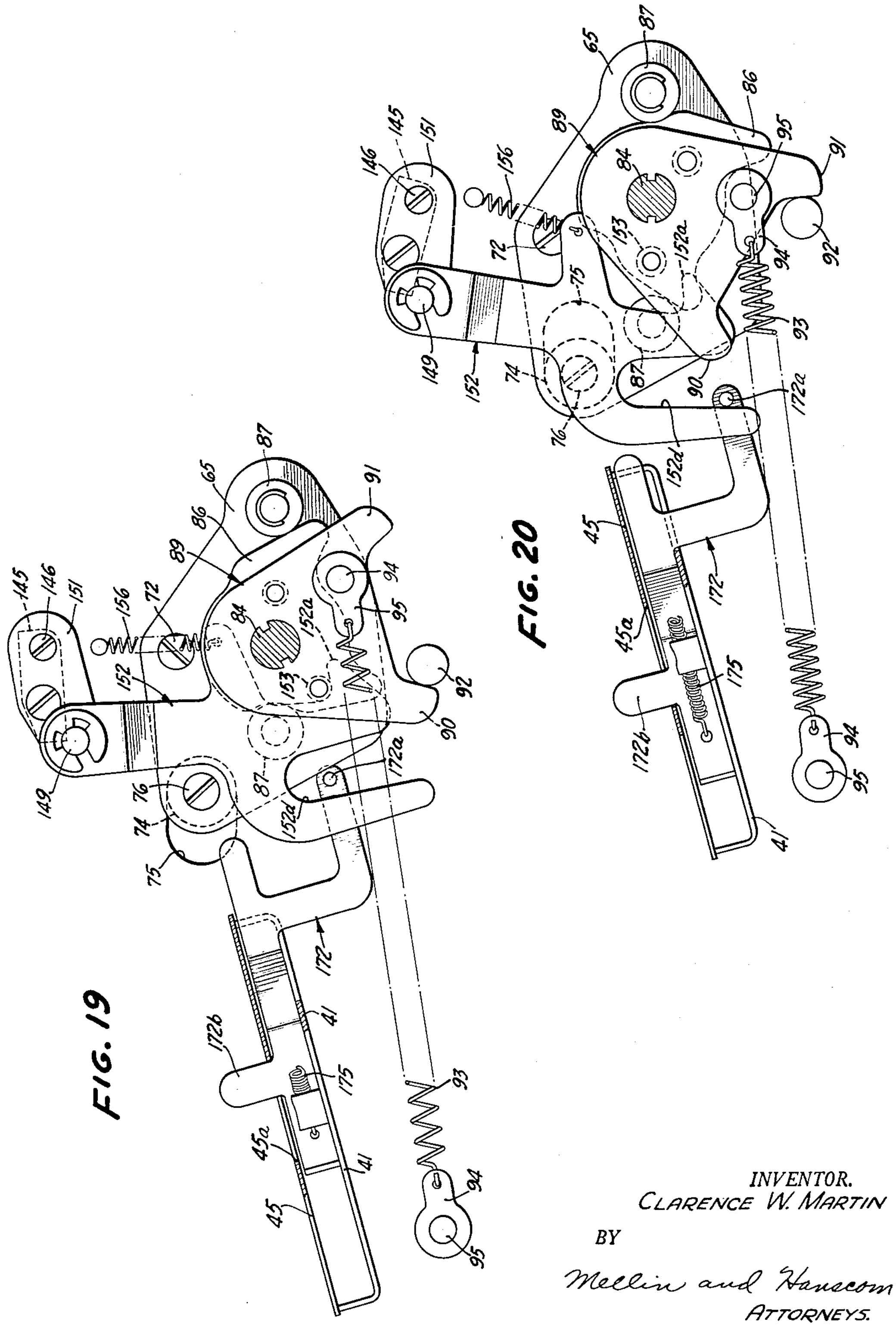
Fig. 19 is a view similar to Fig. 8, but is a fragmentary disclosure of the same, showing the cycle repeat arm in its inoperative position and showing disposition of the parts after the manual operating lever has been fully depressed, Fig. 19 corresponding in position to the showing in Fig. 11.
Fig. 20 is a view similar to Fig. 8, but is a fragmentary disclosure of the same, showing the parts prior to the depression of the manual operating lever, and with the cycle repeat arm in its operative repeat position.

Punch actuators 55 are moved rearwardly by a punch bar 71 disposed in constant engagement with the forward edges of the punch actuators (compare Figs. 9 and 11) by retractor 69 which is secured to the punch bar in a manner to be presently explained. Punch bar 71 has its ends slidably disposed against the inner faces of side frame members 38 and 39, and guided for reciprocating movement relative to said side frame members by a pair of rearwardly disposed laterally extending stub shafts 72 and a pair of forwardly disposed laterally extending guide rollers 73 received respectively by horizontally disposed oblong guide slots 74 and 75 formed in side frame members 38 and 39 (compare Figs. 12 and 20). Stub shafts 72 are received by apertures in end plates 64 and 65, and rollers 73 are mounted on shoulder screws 76 which extend through apertures formed in end plates 64 and 65 of carriage 57 and are threadedly received by punch bar 71. It follows, from the above description, that punch bar 71 is connected to and movable in unison with end plates 64 and 65.

Figure 12:
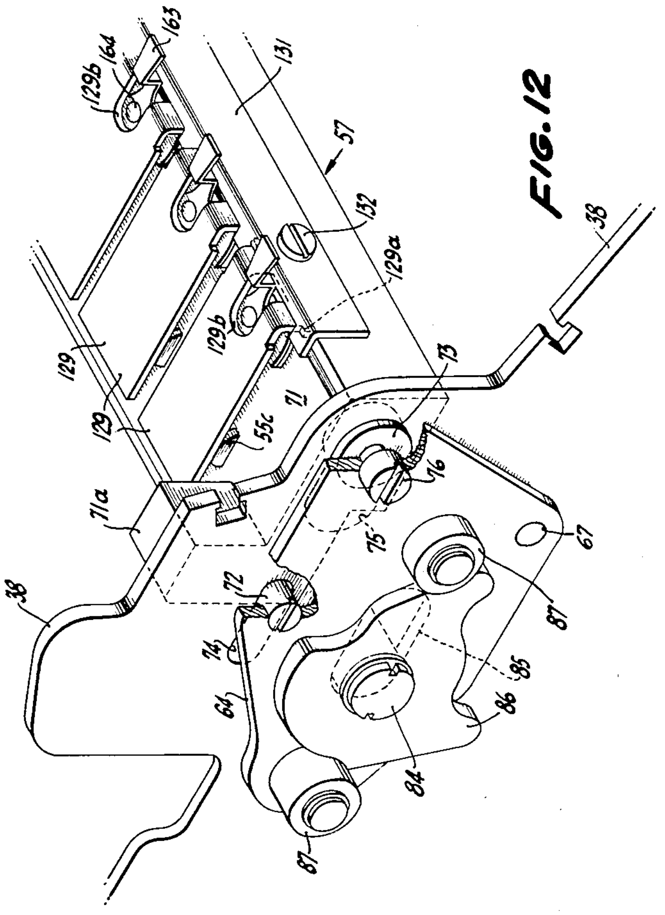
Fig. 12 is an isometric view, showing a part of the carriage mount.

Punch retractor 69 is secured to punch bar 71 by screws (not shown) extending through the upper leg of punch retractor 69 and threadedly received by rearwardly extending block-shaped portions 71*a* formed on punch bar 71 and fitting within retractor 69 (compare Figs. 9 and 12).

The explanation to this point shows that the punch actuators 55 can be selectively elevated by selectively depressing numerical value keys 43 so that when carriage 57 is moved rearwardly the operatively disposed punch actuators are carried into engagement with their associated numerical value punches to drive the punches through a card disposed in die block 47; and so that when carriage 57 is moved forwardly the punch retractor 69 will be effective to retract the actuated punches to their inoperative positions, the positions shown in Fig. 9.

Figure 10:
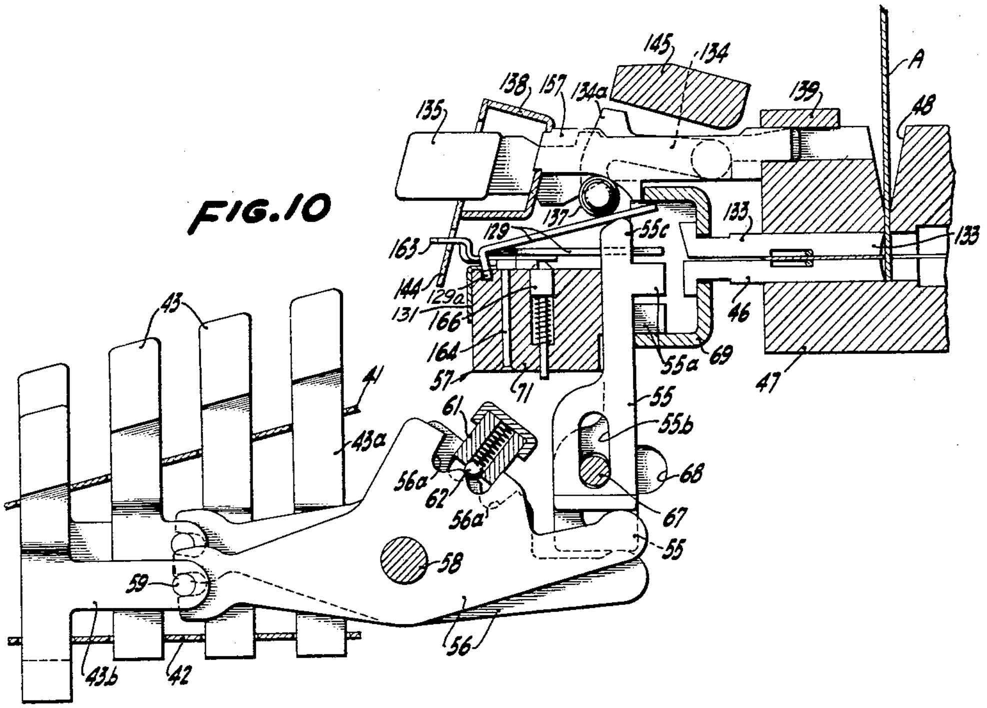
Fig. 10 is a fragmentary view, similar to Fig. 9, showing the position of the parts after one of the main keyboard keys has been depressed.

As is obvious from Fig. 11, retractor 69 moves relative to numerical value punches 46 from the position shown in Fig. 10 to the position shown in Fig. 11 until the punch actuators move into engagement with the rearward ends of numerical value punches 46.

Further instrumentalities mounted on, affected by or operated in conjunction with the traveling carriage 57 will be explained hereinafter; it will suffice to say at this time that these instrumentalities concern the functioning and operation of a set of cipher punches, and a mechanism for effecting the restoration of numerical value punches to their elevated positions.

As is apparent from Fig. 9, there is a paper chip chute 77 disposed rearwardly of die block 47 and removably mounted on the die block by a shoulder screw 78. Chute 77 extends through an opening 79 formed in the rear of case cover 31 and serves to convey paper chips from die block 47 through the rear of the machine. When it is desired to remove case cover 31, the paper chip chute 77 can be removed by removal of shoulder screw 78.

*Carriage drive mechanism*

Carriage 57 is adapted to be reciprocated upon depression of a manually operated lever 80, which is mounted on and keyed to the righthand end of a drive shaft 84. Drive shaft 84 rotatably extends through side frame members 38 and 39 and also extends through clearance slots 85 formed in carriage end plates 64 and 65 (see Fig. 12). Main drive shaft 84 has mounted thereon and keyed thereto adjacent its opposite ends a pair of constant diameter eccentrically mounted cams 86, each of which engages a pair of diametrically disposed rollers 87, the latter being rotatably mounted on carriage end plates 64 and 65 (compare Figs. 7 and 8).

Figure 8:
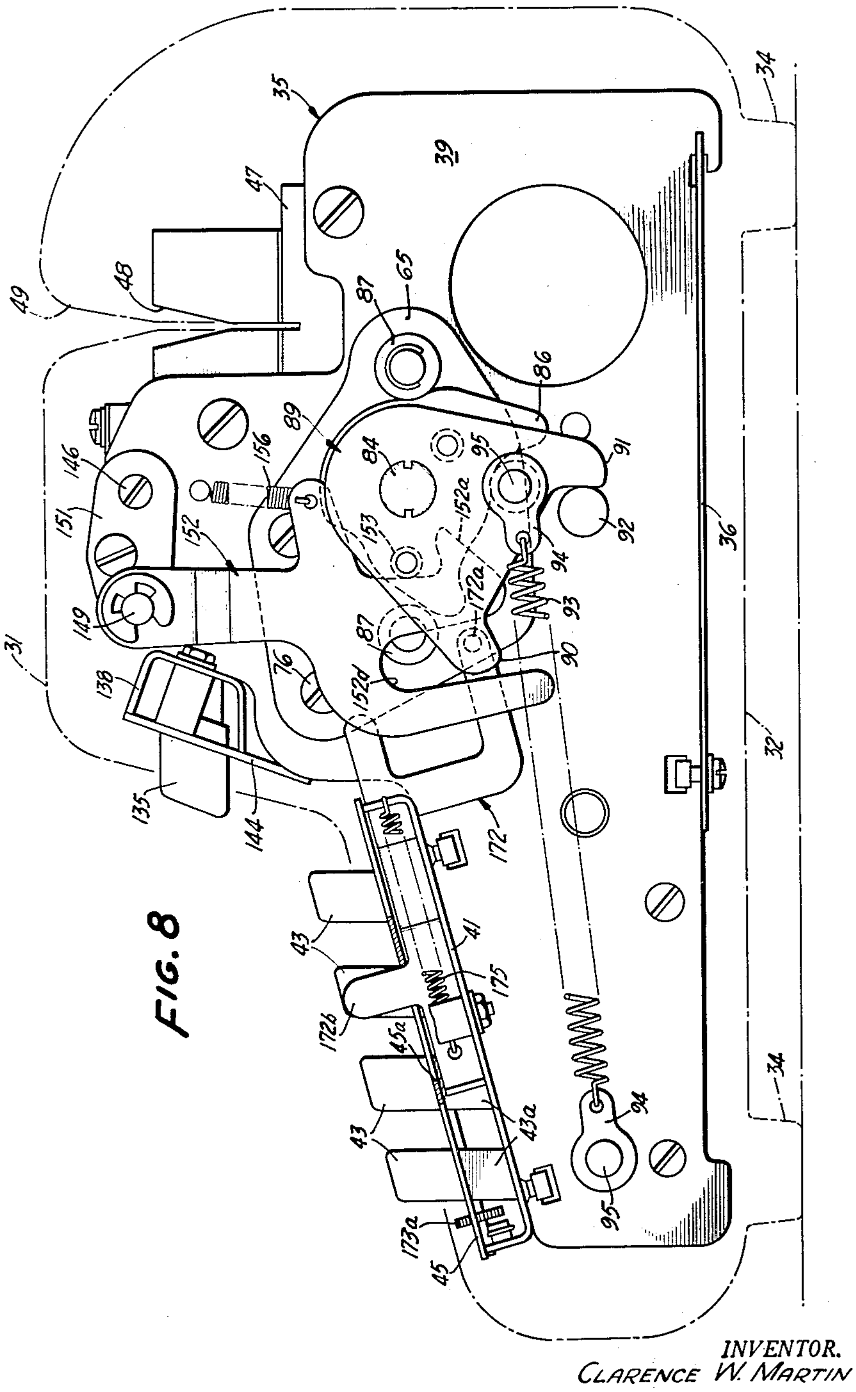
Fig. 8 is a righthand end view of the machine disclosed in Fig. 1, showing the outline in the case in dot-dash lines, and further showing the cycle repeat arm in its inoperative position.

Also keyed to the righthand end of drive shaft 84 inwardly of lever 80 is a stop plate 89 having spaced stop lugs 90 and 91 formed thereon and adapted to alternately engage a stop pin 92 which is fixed to side frame member 39 (see Fig. 8). Urging carriage 57 into its inoperative position and stop lug 91 against stop pin 92, is a tension spring 93 connecting the stop plate to side frame member 39 by means of pivotal collars 94 and pivots 95.

When lever 80 is depressed, cams 86 cause a rearward movement of carriage 57 to drive the actively positioned punches through the card disposed in the machine, and upon release of the lever, spring 93 causes elevation of said lever and retraction of the carriage and punches. The engagement of stop lug 90 and stop pin 92 serves to limit rearward movement of carriage 57.

*Automatic key elevating mechanism*

Referring to Fig. 6, the above mechanism includes a plurality of cipher punch actuating plates 129, there being one for each column of keyboard keys, which plates are carried by carriage 57 by being pivotally mounted at their forward downwardly extending ends by a longitudinally slotted retainer plate 131 fastened to punch bar 71 by screws 132 (see Fig. 9). Retainer plate 131 covers laterally extending lugs 129*a* formed on plates 129 (compare Figs. 12, 14 and 16).

Plates 129 overlie the upwardly extending noses 55*c* of punch actuators 55, each plate 129 overlying a bank of punch actuators corresponding to and associated with one column of numerical value keyboard keys 43. Plates 129 are elevated to inclined positions by the actuators when the actuators are elevated, and operate when depressed to depress the actuators and thereby elevate numerical value keys 43 through the medium of key levers 56 to restore the keys to their normal elevated unset positions.

Plates 129 are also operable to drive a plurality of cipher punches 133 through card A, when they are not tilted, but this structure will be explained hereinafter.

Disposed above and in registry with plates 129 are an equal number of numerical value key restoring arms 134 pivotally carried by horizontally movable column repeat keys 135 on pivots 136, each arm having a roller 137 adapted to ride on the upper face of the associated plate. When restoring arms 134 are depressed, rollers 137 operate to depress plates 129 to cause a restorative action of numerical value keys 43. Further reference to restoring arms 134 will be presently made, but of immediate importance is the construction of column repeat keys 135.

Column repeat keys 135 are slidably supported for horizontal movement by having their forward ends slidably receivable through slots provided in a U-shaped guide plate 138 secured at its ends to side frame members 38 and 39, and by having their rearward ends slidably receivable through aligned slots formed in die block 47. The latter slots are preferably formed by transversely notching die block 47 and covering the notches with a cover plate 139 secured to the die block by screws 141 (see Fig. 6). Column repeat keys 135 are urged forwardly and downwardly by tension springs 142 connected at one set of ends to the column repeat keys by pins 143 and connected at their other ends at a lower level to the U-shaped guide member 138 (see particularly Fig. 15). Stop shoulders 135*a* are formed on the upper edges of column repeat keys 135 and serve to limit forward movement of the column repeat keys as shown in the case of the nearest column repeat key in Fig. 15. There is a reticulated face plate 144 secured to U-shaped guide member 138, said reticulated face plate having an upper row of openings to accommodate the heads of column repeat keys 135, as is apparent from a comparison of Figs. 1, 14 and 15. When column repeat keys 135 are moved to their outer or forwardmost positions, as shown in the case of the nearest column repeat key in Fig. 15, the repeat keys rest on depending protuberances 135*b* defined at their forward faces by stop shoulders 135*c*, as clearly shown in Fig. 15.

Figure 22:
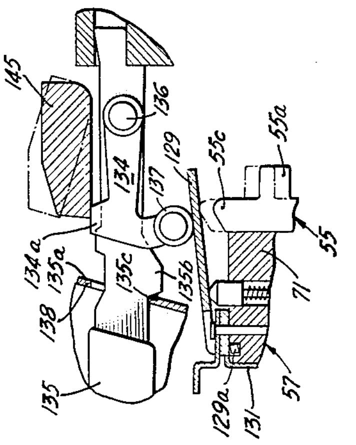
Fig. 22 is a fragmentary view of Fig. 10, but showing the positions which the cipher punch actuating plates and the cipher punch actuators assume when the parts in Fig. 19 assume the positions there shown.

Column repeat keys 135 are shiftable from their outer slightly upwardly inclined positions (see the keys of Fig. 15) inwardly or rearwardly and somewhat downwardly to intermediate positions, as shown in the case of the repeat key disclosed in Figs. 10 and 22, and held in such intermediate position by shoulders 135*c* disposed in engagement with U-shaped guide plate 138.

In these intermediate positions, column repeat keys 135 are adapted to dispose upwardly protruding portions 134*a* formed on restoring arms 134 under a key restorer bar 145, which when depressed depresses the rearwardly disposed restoring arms 134, pivoting them downwardly relative to their respective column repeat keys 135. Rollers 137 on arms 134 depress plates 129, and through the medium of punch actuators 55 and key levers 56 restore numerical value keys 43 to their normal elevated unset positions.

Key restorer bar 145 is mounted for pivotal movement about its rear edge by laterally extending studs 146 pivotally received by side frame members 38 and 39 (compare Figs. 6 and 8). A leaf spring 147 fastened to die block cover plate 139 by screws 148 (see Fig. 9) limits upward tilting movement of restorer bar 145.

Referring particularly to Figs. 6 and 8, restorer bar 145 has fixed to its right hand end an end plate 151 carrying a pivot 149, extending through the upper end of a restorer bar actuator 152. Actuator 152 has a bottom hook 152a formed thereon, adapted to be engaged by a pin 153 carried by the adjacent constant diameter cam 86. A tension spring 156, connecting actuator 152 to side frame member 39, urges said actuator in a counterclockwise direction, as the parts are depicted in Fig. 8, against pin 153.

As is apparent from Fig. 8, pin 153 is normally disposed in spaced relation above hook 152a so that restorer bar is actuated just as lever 80 reaches the bottom of its stroke. If the column repeat keys 135, associated with the set numerical value keys, are disposed in their intermediate positions, so as to dispose the upwardly protruding portions 134a of the associated restorer arms 134 under the restorer bar, the set numerical value keys will be elevated by engagement of the restorer bar with portions 134a. A mechanism for allowing an overall repeat operation for the punches will be explained hereinafter.

It is frequently desirable to be able to perform a partial repeat operation, i. e., repeat a particular pattern of set numerical value keys in certain columns. To accomplish this, the selected column repeat keys are slightly lifted to clear their depending shoulders 135b of the guide plate 138, thus releasing the selected keys for forward movement under the influence of tension springs 142, until the upward protruding shoulders 135a of the column repeat keys 135 engage guide plate 138, such action carrying restoring arms 134 forwardly and disposing their upwardly protruding portions 134a out from under restoring bar 145 so as to inactivate the selected columns against the restorative action of the restoring bar. Therefore, the depressed numerical value key or keys of the associated columns of numerical value keys will remain in their depressed set positions for the next cycle of operation, and the unselected column of keys, being elevated and unset, may be selectively reset as desired.

*Manual collective reset arrangement*

In case a numerical value key or keys are mistakenly depressed, they can be restored or elevated to their normal unset positions prior to the depression of lever 80 by the following arrangement. Fixedly mounted by their opposite ends in aligned slots provided by U-shaped guide plate 138 and die block 47 (see Fig. 14) are a plurality of key restoring cams 157, equal in number to the number of column repeat keys and arranged between the column repeat keys as shown in Fig. 6. These cams have rearwardly and downwardly curving cam surfaces 157a engageable with rollers 158 carried by restoring arms 134 coaxially with previously described rollers 137. Rollers 158 are slightly smaller than rollers 137 so that rollers 158 clear plates 129 and are allowed free rolling movement against the cam surfaces 157a of key restoring cams 157.

Figure 14:
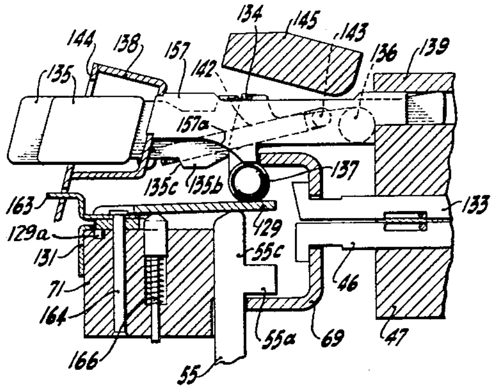
Fig. 14 is a fragmentary view of part of Fig. 9, showing the nearest column repeat key shoved inwardly to a position for returning an associated main keyboard key to unset position, for correcting a mistake in setting the keys prior to a punching operation.
Figure 15:
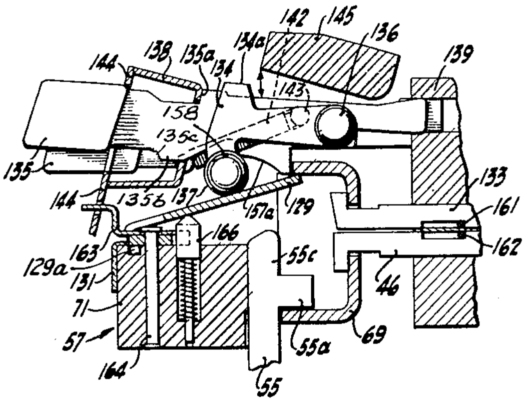
Fig. 15 is a view similar to Fig. 14, but showing the nearest column repeat key in its forwardmost position to inactivate the column of keyboard keys, associated with the nearest column repeat key, for restorative movement.

Since each plate 129 controls the restorative action of a column of numerical value keys 43, one or more keys in a particular column can simultaneously be elevated and restored to unset positions by shifting the appropriate column repeat key 135 inwardly or rearwardly to a point past its intermediate position to a rearward position to bring the associated roller 158 into engagement with the cam surface 157a of the associated restorer cam 157, such as shown in the case of the nearest column repeat key 135, restorer arm 134, roller 158 and roller 137, as shown in Fig. 14, roller 158 and restorer arm 134 being driven downwardly and driving downwardly the associated plate 129, and through the medium of the associated bank of key actuators 55 and associated bank of key levers 56 restoring the associated column of keys 43 to their elevated positions.

*Cipher punch mechanism*

It is frequently desirable and necessary to be able to set up the machine so that if any columns on the main numerical value keyboard have all their keys in elevated positions, a cipher slot will be formed in the card in the area assigned to that particular column of keys. In the present invention, it is particularly desirable to slot through a card from the "1" perforation to a zero perforation disposed further inwardly from the margin of the card in alignment with the "1" perforation. Furthermore, at other times it is desirable to be able to leave certain areas of a card blank, that is, unnotched or unslotted, for allowing notching at a subsequent time. This operation may be referred to as a partial blanking of a card. To optionally allow the above described operations and results, a suitable mechanism is provided.

As was previously mentioned, die block 47 carries cipher punches 133 which are disposed above the numerical value punches 46 and receivable in and guided by horizontal recesses formed through the die block and separated from the lower punches by a wear plate 159.

The lower set of recesses in die block 47 are formed in the die block so that the lower surfaces of the numerical value punches will be substantially flush with or slightly lower than the transverse longitudinal card receiving groove 48 extending across the die block whereby, when the punches are driven rearwardly through the card receiving groove 48, the edges of the card engaged by the numerical value punches 46 will be notched and the cards will be slotted, not notched, by the cipher punches 133.

Cipher punches 133 have upwardly extending fingers or protrusions at their forward ends engageable with punch retractor 69 to enable retraction of the cipher punches 133 after they are driven into engagement with card A. Cipher punches 133 have downwardly opening notches formed therein for receiving guide wires or rods 161 which serve to retain the punches within the die block 47. Similar wires and upwardly opening notches 162 are provided for the numerical value punches 46, as is clearly shown in Fig. 15.

In the particular embodiment of the invention shown, there is one cipher punch for each column of keys 43 and, therefore, one cipher punch for each cipher punch actuating plate 129. Plates 129 are adapted when disposed horizontally to engage and drive the cipher punches 133 rearwardly through card A, as is apparent from Fig. 11, attention being directed to the cipher punch and plate in the background. Plates 129 under the influence of gravity will normally assume horizontal positions, but will be selectively tilted when numerical value keys in selected columns with which the plates are associated are depressed, since the punch actuators 55 associated with these keys 43 will be elevated by such setting of the keys to therefore elevate the plates associated therewith.

It follows from the above description that a card will be automatically slotted for zero in the areas assigned to a column of numerical value keys when no key in a particular column is depressed.

To allow for certain areas corresponding to the columns of numerical value keys to remain blank on the card for future coding, a plurality of cipher punch control levers 163, equal in number to the number of cipher punch actuating plates, are provided. Each control lever is notched at 163a and provided with a handle portion extending through an opening 129b formed in the associated cipher punch actuating plate, and through a slot formed in the reticulated face plate 144 (compare Figs. 1 and 14), to be exposed for manipulation by a person operating the machine.

Each cipher punch control lever 163 is recessed at

163*b* (compare Figs. 16, 17 and 18), to provide a relatively thin camming portion. Each cipher punch control lever 163 is pivotally mounted on punch bar 71 by a rivet 164 (see Fig. 14), for pivotal movement from a mounter-clockwise position, as shown for the righthand cipher control lever 163 in Fig. 16, to a clockwise position as shown in the case of the lefthand control lever in Fig. 16. Cipher punch control levers 163 are adapted to be releasably retained in their counter-clockwise positions by the engagement of spring-pressed balls 165, carried by punch bar 71 (see Fig. 18), with indentations **163*c* formed in the cipher punch control levers 163**.

Figure 16:
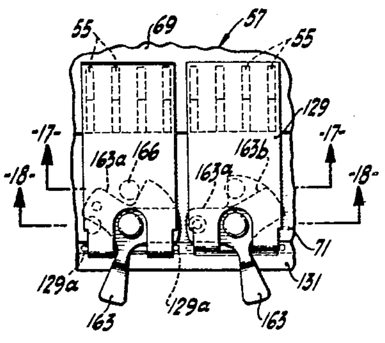
Fig. 16 is a fragmentary top plan view of a portion of Fig. 6, showing two cipher punch control levers in different positions.

There are a plurality of spring-pressed cipher punch actuating plate lifting plungers 166 also mounted in punch bar 71, being equal in number to the number of control levers and disposed in the path of travel of the camming portions of the cipher punch control levers 163 (see Fig. 16). When these spring-pressed lifting plungers 166 are released, by clockwise movement of the associated control levers, the plungers are operable to lift the associated cipher punch actuating plates 129 to inclined positions, as shown in the case of the plate 129 in Fig. 15, so that upon forward movement of the carriage 57 the forward edges of plates 129 do not engage cipher punches 133 and therefore leave the areas of the card corresponding to the selected control levers blank for future coding.

Figure 17:
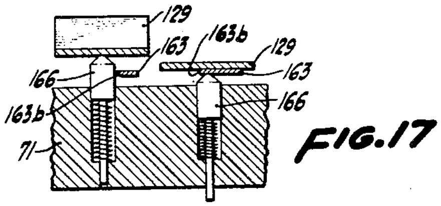
Fig. 17 is a vertical cross sectional view taken along line 17—17 of Fig. 16, showing two actuating plate elevating plungers in different positions.
Figure 18:
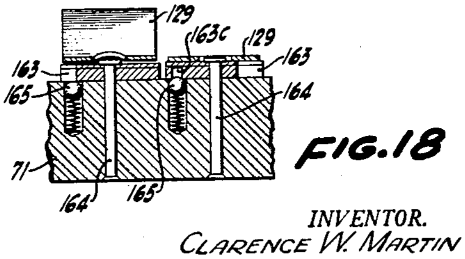
Fig. 18 is a vertical cross sectional view taken along line 18—18 of Fig. 16, showing the manner of mounting the cipher punch control levers.

However, if it is desired to cipher slot certain selected areas in a card in which no value notches are to be formed, the column repeat keys 135 associated with the particular columns of numerical value keys which are not to be set are shifted inwardly or rearwardly to their inwardmost or rearwardmost positions to depress the associated plates from the position shown for the lefthand plate in Fig. 17 to a position to enable the associated control lever to be shifted to its counter-clockwise position and enable the camming portion thereof to engage the apex head of the associated plunger and cam the plunger slightly downwardly from its already depressed position and to retain the plunger in its downward position. This action allows the cipher punch actuating plate to assume a horizontal position unless one of the associated bank of punch actuators is elevated, therefore enabling the cipher punch actuating plate, when the carriage moves rearwardly, to drive its associated cipher punch through the card and therefore cipher punch the card to indicate that no numerical value keys in that particular column have been depressed or set.

By pivoting selected cipher punch control levers, selected areas of a card can be blanked, other areas left to be cipher punched or numerical value notched, depending on whether the associated columns of numerical value keys are depressed or left in elevated positions.

*Aligning pin arrangement*

Figure 13:
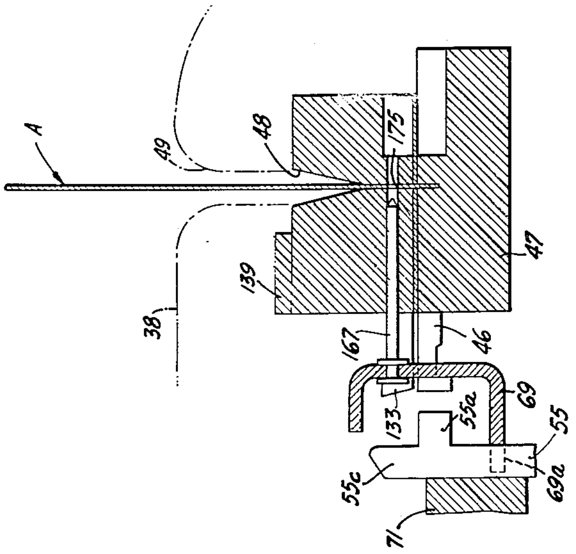
Fig. 13 is a fragmentary vertical sectional view through the machine, showing the aligning pin.

As previously mentioned in the first part of this specification, a classification card may be inserted through slot 49 in the case cover 31 and disposed against the adjustable card positioning gauge 52 to dispose the areas of the card to be coded in alignment with their corresponding numerical value punches and in alignment with the cipher punches. However, to assure a precise alignment, an aligning pin 167 (best shown in Figs. 9 and 13) is provided and slidably received through a bore provided in die block 47, said aligning pin being secured at its forward end to the retractor 69. As shown in Fig. 13, when the machine is in a rest position the rearward aligning tapered nose of the aligning pin is disposed in slightly spaced relation with respect to the forward face of the classification card a distance substantially less than the horizontal distance between the punch engaging noses **55*a* of punch actuators 55 and the rearward ends of numerical value punches 46. During each cycle of operation, the aligning pin will first enter a hole 175** formed in the card (see Fig. 2) prior to the engagement of the punch actuators with the numerical value punches to precisely align the card with the punches.

*Repeat control mechanism*

Actuator 152 is adapted to be manually moved to an inactive position by a cycle repeat arm 172 which is slidably mounted between plates 41 and 45 and has a rearwardly extending finger carrying a pin **172*a*, said pin extending laterally outward through an opening 152*d* formed in actuator 152**.

Cycle control arm 172 has an upstanding handle **172*b* fitting within a slot 45*a* formed in keyboard plate 45 and adapted to be positioned on either side of a lug 45*d* extending into the middle of slot 45*a*. A diagonally arranged spring 175, which is connected at its opposite ends to cycle repeat arm 172 and lower plate 41, functions to yieldably retain handle 172*b*** in whichever of its two positions in which it is set.

Figure 21:
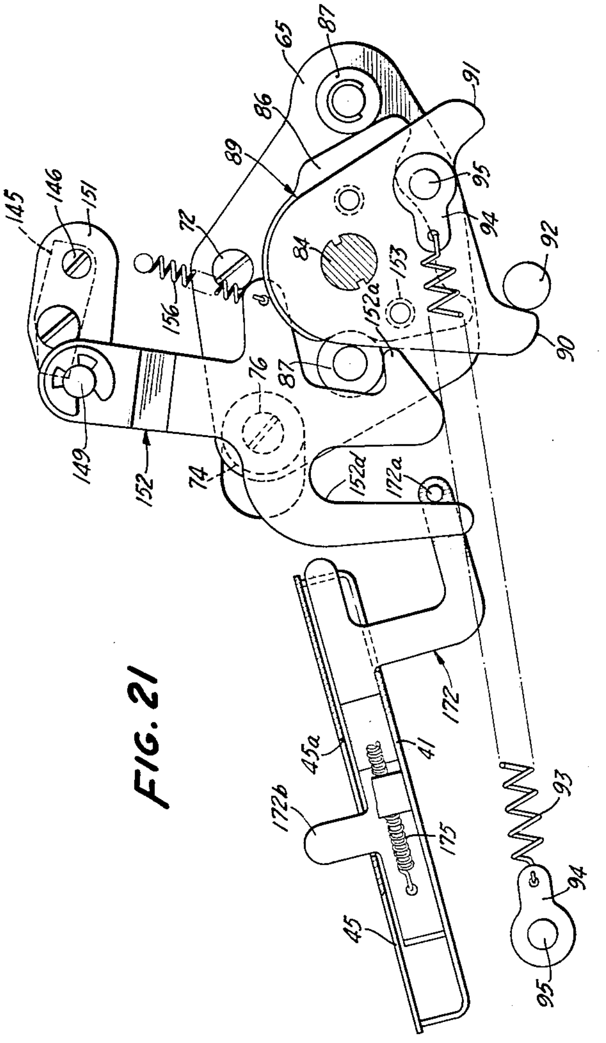
Fig. 21 is a view similar to Fig. 20, but showing the disposition of the parts after the depression of the manual operating lever.

As shown in Fig. 6, cycle repeat arm 172 is disclosed in its rearwardmost position where its pin **172*a* is freely disposed in opening 152*d* of actuator 152. Therefore, the actuator can be actuated without interference or contact with pin 172*a*. However, when arm 172 is shifted forwardly, pin 172*a* engages actuator 152 causing a clockwise movement of the latter and consequently causing hook 152*a* to become misaligned with pin 153. Therefore, when pin 153 is carried downwardly during the operation of carriage 57 by the righthand side cam 86, it is incapable of pulling the restorer bar actuator 152 downwardly so that the restorer bar 145** remains in its inoperative position (shown in Fig. 21) leaving all the numerical value keyboard keys, which have been depressed and set, in their depressed position, thereby enabling a repeat coding of an identical nature to be carried out on a succeeding card or on as many cards as desired.

The numerical value keyboard may be provided with a plurality of indicators 173, there being one between each pair of adjacent columns. Each indicator is differently colored on its opposite sides and pivotally supported at its ends by notches in the upstanding ends of guide plate 41. Each indicator has a serrated disc **173*a* exposed by a slot in face plate 45 to enable manipulation of the indicator. A tension spring 174, secured at its ends to side frame members 38 and 39, engages overcenter pins 173*d*** on the indicator to retain the same in the positions in which they are set. These indicators are useful in visually separating the columns of numerical value keys from one another to assist with operating the machine doing partial repeat operations and the like.

*Operation of machine*

Figure 2:
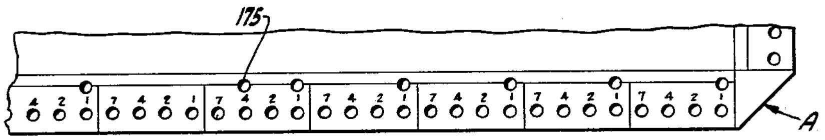
Figs. 2, 3, 4 and 5 are different views of a card edge, the card edges in Figs. 3, 4 and 5 having been notched and/or slotted by the machine disclosed in Fig. 1.

The operation of the various parts of the machine has been explained along with the detailed explanation and hence need only be summarized in connection with the punching of a card such as shown in Figs. 2, 3, 4 and 5. Fig. 2 shows the edge of a card prior to coding thereof. Each card is provided with an alignment hole 175 (as previously mentioned) adapted to be disposed in approximate registry with aligning pin 167 when the card is inserted into the machine and disposed against adjustable gauge 52. Merely for purposes of illustration and obviously not intended to represent a practical operation of the machine, the card A disclosed in Fig. 2 can be inserted in the machine and the machine operated without any coding of the card by leaving all the numerical value keys 43 in their elevated unset positions and shifting all the cipher punch control levers 163 so as to release lifting plungers 166 and therefore allow the plungers to tilt the plates 129 to the position shown for plate 129 in Fig. 15. Obviously, since none of the punch actuators 55 have been elevated and since all plates 129 have been elevated, upon a forward movement of carriage 57 none of the punches, either the numerical value punches 46 or the cipher punches 133 are engaged and therefore the card remains unnotched.

Figure 3:
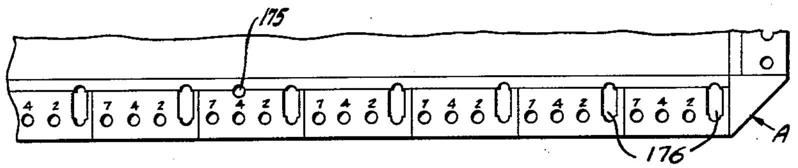

Fig. 3 shows the card disclosed in Fig. 2 as having been inserted into the machine and the machine operated with none of the numerical value keys 43 depressed, but with the lifting plungers 166 inactivated by operation of cipher punch control levers 163 to free plates 129 from the influence of lifting plungers 166. Plates 129 therefore assume horizontal positions and upon rearward movement of carriage 57 operate to drive cipher punches 133 through the card to cipher slot the card.

Figure 4:
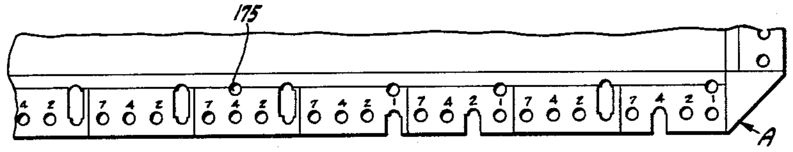

In Figs. 2, 3, 4 and 5 only seven punching areas have been disclosed, but it is obvious that the cards could have more or less punching areas and that the punching machine could have more or less columns of numerical value punches. For coding the card in the manner as shown in Fig. 4, the four righthand columns of numerical value keys 43 on the machine are utilized and the remaining five columns to the left are unset. For coding "1204," the first (reading from left to right) of the four just mentioned columns has the "1" numerical value key thereof depressed, the second of the aforementioned four columns has the "2" numerical value key depressed and set, the third column of the identified four columns is left in elevated condition, and the fourth column of keys has the "4" numerical value key depressed. The lifting plungers 166 for all the columns are inactivated. Upon a depression of lever 80, the numerical value punches associated with the numerals "1," "2" and "4" will be driven through the correct areas of the card, and the cipher punches associated with the remaining columns in which all the keys remain in elevated condition will be driven through their associated areas so as to punch out the card material between the zero perforation and the "1" perforation in each of the areas.

Figure 5:
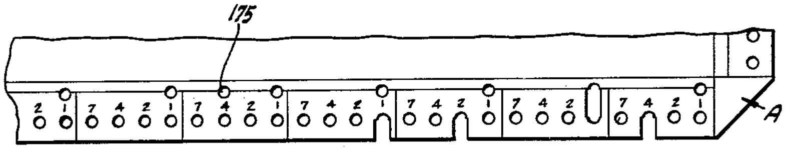

Fig. 5 shows the card disclosed in Fig. 2 as having been coded by the machine, when the machine has been set up to blank the lefthand five areas of the card and to code the righthand four areas of the card, only three of the lefthand five columns being shown. To obtain this result, the cipher punch control levers 163 for the lefthand five columns of numerical value keys are moved to activate the associated lifting plungers 166, which plungers operate to lift the associated cipher punch actuating plates 129 to prevent engagement thereof with the associated cipher punches. The number "1204" is set on the righthand four columns of numerical value keys and when the machine is operated, the lefthand five areas of the card will be blank for future coding, whereas the righthand four columns will be coded for "1204."

By the present invention, there has been provided a card punching machine designed to be manually operated by a simple and inexpensive manually driven mechanism, and which machine is also equipped with a manually operable cycle repeat arm by which a coding pattern can be repeated or not depending on the position of such arm.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A device of the class described comprising a punching station, two sets of punches adapted to punching cards positionable in said punching station, a keyboard having a plurality of settable keys arranged in a plurality of rows, each row corresponding to a coding zone on said card, a carriage having mounted thereon a first set of punch actuators equal in number to the number of keys on said keyboard, means connecting each of said first set of punch actuators to a key on said keyboard for actuation thereby from an inoperative to an operative position, each of said first set of actuators when activated by its key to an operative position adapted to contact a punch in the first of said sets of punches to cause said punch to punch said card upon actuation of said carriage, the second of said sets of punches having a plurality of zero punches equal in number to the number of rows on said keyboard, a second set of punch actuators mounted on said carriage equal in number to the number of punches in said second set of punches, said second set of actuators being normally positioned to actuate said zero punches upon operation of said carriage, means on each of said first punch actuators for moving the second punch actuator associated with the column containing said first actuator to inactive position when said first actuator is moved to operative position, manual means for reciprocating said carriage comprising, a hand lever, a transverse shaft mounted in said device for oscillation about its axis and having on each end thereof an eccentrically mounted constant diameter cam, said shaft being connected to said hand lever for oscillation thereby, a pair of diametrically opposed rollers on each end of said carriage in contact with the surface of said constant diameter cam, whereby when said cam is oscillated by actuation of said hand lever said carriage will be reciprocated by said punching station.

2. A device of the class described comprising a punching station, two sets of punches adapted to punching cards positionable in said punching station, a keyboard having a plurality of settable keys arranged in a plurality of rows, each row corresponding to a coding zone on said card, a carriage having mounted thereon a first set of punch actuators equal in number to the number of keys on said keyboard, means connecting each of said first set of punch actuators to a key on said keyboard for actuation thereby, from an inoperative to an operative position, each of said first set of actuators when activated by its key to its operative position adapted to contact a punch in the first of said sets of punches to cause said punch to punch said card upon actuation of said carriage, the second of said sets of punches having a plurality of zero punches equal in number to the number of rows on said keyboard, a second set of punch actuators mounted on said carriage equal in number to the number of punches in said second set of punches, said second set of actuators being normally positioned to actuate said zero punches upon actuation of said carriage, means on each of said first punch actuators for moving the second punch actuator associated with the column containing said first actuator to inactive position when said first actuator is moved to operative position and means to selectively manually render any of said zero punch activators inoperative regardless of whether any of the first set of actuators associated therewith is operated, in combination with manual means for reciprocating such carriage, comprising a hand lever, a transverse shaft mounted in said device for oscillation about its axis and having on each end thereof an eccentrically mounted constant diameter cam, said shaft being connected to said hand lever for oscillation thereby, a pair of diametrically opposed rollers mounted on each end of said carriage and cooperating with said cam, whereby when said hand lever is operated to oscillate said cams, the carriage will be reciprocated towards and away from said punching station.

3. In a device as set forth in claim 2, means for restoring said actuators to their original unset position after each cycle of said carriage actuating means.

4. In a device as set forth in claim 3, means for selectively rendering said restoring means for any one row of actuators inoperative.

References Cited in the file of this patent

UNITED STATES PATENTS

| | | |
|---|---|---|
| 1,397,007 | Knistrom | Nov. 15, 1921 |
| 1,981,932 | Welk | Nov. 27, 1934 |
| 2,035,777 | Welk | Mar. 31, 1936 |
| 2,062,153 | Welk et al. | Nov. 24, 1936 |
| 2,062,155 | Welk et al. | Nov. 24, 1936 |